US009510172B2

(12) United States Patent
Schuler et al.

(10) Patent No.: US 9,510,172 B2
(45) Date of Patent: Nov. 29, 2016

(54) METHOD AND APPARATUS FOR RECEIVING A DATA STREAM DURING AN INCIDENT

(71) Applicant: MOTOROLA SOLUTIONS, INC., Schaumburg, IL (US)

(72) Inventors: Francesca Schuler, Palatine, IL (US); Ethan Y. Chen, Wilmette, IL (US); Katrin Reitsma, Chicago, IL (US); James A. Marocchi, Winfield, IL (US); Lisa S. Whitelock, Downers Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 20 days.

(21) Appl. No.: 14/587,427

(22) Filed: Dec. 31, 2014

(65) Prior Publication Data
US 2015/0140950 A1 May 21, 2015

Related U.S. Application Data

(62) Division of application No. 13/731,622, filed on Dec. 31, 2012.

(51) Int. Cl.
*H04W 4/22* (2009.01)
*H04L 29/06* (2006.01)
(Continued)

(52) U.S. Cl.
CPC ............ *H04W 4/22* (2013.01); *H04L 63/10* (2013.01); *H04M 11/04* (2013.01); *H04N 7/181* (2013.01);
(Continued)

(58) Field of Classification Search
CPC ... H04W 76/007; H04W 4/22; H04W 12/02; H04W 12/06; H04W 12/10; H04W 12/12; H04L 63/10; H04M 11/04

USPC ............ 455/404.1, 404.2, 3.06, 410, 411, 455/414.2, 414.3, 418–420
See application file for complete search history.

(56) References Cited

U.S. PATENT DOCUMENTS 7,409,202 B2   8/2008   McClendon
7,418,085 B2   8/2008   Rodkey et al.
(Continued)

FOREIGN PATENT DOCUMENTS

WO   03/065754 A1   8/2003

OTHER PUBLICATIONS

PCT International Search Report Dated Feb. 25, 2014 Counterpart to PCT/US2013/071961.
(Continued)

*Primary Examiner* — Magdi Elhag

(57) ABSTRACT

A method and apparatus are provided, for accessing a data-capture device in a different domain, by public safety wireless communications equipment, for the purpose of obtaining information at an incident. A dispatch controller of a public safety wireless communications system receives an access token from a server of a non-public-safety network, when an incident occurs. The token allows access to a data-capture device, and is associated with the incident. The dispatch controller sends the token to the data-capture device, receives a data stream, and forwards the data stream to a public safety wireless communication device. The public safety wireless communication device may itself discover and access the data-capture device, and may receive the data stream directly from the data-capture device. The public safety wireless communication device may forward the data stream and/or the access token to other public safety wireless communication devices.

9 Claims, 12 Drawing Sheets

(51) Int. Cl.
  *H04M 11/04*  (2006.01)
  *H04W 4/02*   (2009.01)
  *H04W 4/10*   (2009.01)
  *H04W 12/08*  (2009.01)
  *H04N 7/18*   (2006.01)
  *H04W 12/06*  (2009.01)
  *G08B 25/08*  (2006.01)
  *H04W 84/08*  (2009.01)
  *H04W 88/04*  (2009.01)
  *H04W 92/02*  (2009.01)

(52) U.S. Cl.
  CPC ............... *H04W 4/021* (2013.01); *H04W 4/10* (2013.01); *H04W 12/06* (2013.01); *H04W 12/08* (2013.01); *G08B 25/08* (2013.01); *H04W 4/02* (2013.01); *H04W 84/08* (2013.01); *H04W 88/04* (2013.01); *H04W 92/02* (2013.01)

(56) References Cited

U.S. PATENT DOCUMENTS

| | | | |
|---|---|---|---|
| 7,929,010 | B2 | 4/2011 | Narasimhan |
| 7,996,465 | B2 | 8/2011 | Cromp et al. |
| 8,068,986 | B1 | 11/2011 | Shahbazi et al. |
| 8,069,241 | B2 | 11/2011 | Motoyama et al. |
| 8,116,723 | B2 | 2/2012 | Kaltsukis |
| 8,145,183 | B2 | 3/2012 | Barbeau et al. |
| 8,155,671 | B2 | 4/2012 | Wood et al. |
| 8,204,473 | B2 | 6/2012 | Mathis et al. |
| 8,301,765 | B2 | 10/2012 | Goodman |
| 8,305,211 | B1 | 11/2012 | Morris et al. |
| 2001/0045983 | A1 | 11/2001 | Okazaki et al. |
| 2003/0109306 | A1 | 6/2003 | Karmarkar |
| 2004/0204048 | A1 | 10/2004 | Lamensdorf |
| 2005/0061876 | A1 | 3/2005 | Philyaw et al. |
| 2005/0174229 | A1 | 8/2005 | Feldkamp et al. |
| 2005/0251549 | A1 | 11/2005 | Hlasny |
| 2005/0254514 | A1 | 11/2005 | Lynn |
| 2007/0205888 | A1 | 9/2007 | Lee et al. |
| 2009/0143045 | A1 | 6/2009 | Graves et al. |
| 2010/0009703 | A1 | 1/2010 | Sornay |
| 2011/0059748 | A1 | 3/2011 | Taylor et al. |
| 2011/0151904 | A1 | 6/2011 | Mock |
| 2011/0207429 | A1 | 8/2011 | Maier et al. |
| 2011/0239276 | A1 | 9/2011 | Garcia Garcia et al. |
| 2011/0281547 | A1 | 11/2011 | Cordero |
| 2011/0296513 | A1 | 12/2011 | Kasad |
| 2012/0066315 | A1 | 3/2012 | Tuman |
| 2012/0109830 | A1* | 5/2012 | Vogel .............................. 705/75 |
| 2012/0190325 | A1 | 7/2012 | Abu-Hakima et al. |
| 2013/0057384 | A1 | 3/2013 | Morris et al. |
| 2014/0133831 | A1* | 5/2014 | Billau et al. .................. 386/262 |
| 2014/0187190 | A1 | 7/2014 | Schuler et al. |

OTHER PUBLICATIONS

Non-Final Office Action mailed Jul. 2, 2014, in U.S. Appl. No. 13/731,622, Schuler F. et al., filed Dec. 31, 2012.

Notice of Allowance mailed Nov. 5, 2014, in U.S. Appl. No. 13/731,622, Schuler F. et al., filed Dec. 31, 2012.

Non-Final Office Action mailed Feb. 27, 2015, in U.S. Appl. No. 13/731,622, Schuler F. et al., filed Dec. 31, 2012.

Notice of Allowance mailed Aug. 26, 2015, in U.S. Appl. No. 13/731,622, Schuler F. et al., filed Dec. 31, 2012.

Patent Examination Report No. 1 mailed Nov. 9, 2015, for corresponding Australian Patent Application No. 2013368381, filed Nov. 26, 2013.

* cited by examiner

| CIRCLED REFERENCE ON FIG.s 10 AND 11 | REFERENCE SIGNIFIES: |
|---|---|
| 1 | AUTHENTICATION & ACCESS REQUESTS (INCIDENT ID) |
| 2 | MUTUAL AUTHENTICATION |
| 3 | DOMAIN SERVERS ISSUE ACCESS TOKEN (INCIDENT ID, DOMAIN) |
| 4 | FORWARD THE ACCESS TOKEN |
| 5a | DISTRIBUTE ACCESS TOKEN WITHIN TALK GROUP AT SCENE |
| 5b | SEND ACCESS TOKEN TO CAD |
| 6a | ON SCENE DEVICE SENDS ACCESS TOKEN |
| 6b | CAD SENDS ACCESS TOKEN |
| 7a | PA-1 CAD DATA DISTRIBUTION |

*FIG. 10*

METHOD AND APPARATUS FOR RECEIVING A DATA STREAM DURING AN INCIDENT

CROSS-REFERENCE TO RELATED APPLICATION

The present application is a divisional application of, and claims priority to, U.S. patent application Ser. No. 13/731,622, filed in the United States Patent Office on Dec. 31, 2012, the entire contents of which are incorporated herein by reference.

FIELD OF THE DISCLOSURE

The present disclosure relates generally to securely accessing a data-capture device during an incident for the purpose of obtaining data-capture information, and more particularly to expanding the information available to public safety wireless communications devices during an incident.

BACKGROUND

Public safety personnel are routinely equipped with mobile or portable radio communications equipment, henceforth 'mobile communication devices'. These devices are linked to other mobile communication devices by a public safety communications network. When public safety personnel working as 'first responders' are called to an incident, they may receive information from various sources. One source is a dispatch controller forming part of the public safety communications network. Another source will be other members of a communication group, often referred to by public safety personnel as a 'talk group', of which the first responder is a member.

At an incident, there may be public safety equipment such as cameras mounted on a public safety vehicle that has been called to the location of the incident. A first responder may be able to receive information, such as pictures, which are sent from the cameras to the first responder's mobile communication device. The first responder may receive the information via the dispatch controller of the public safety communications network.

At an incident, there may also be other equipment that does not form part of the public safety communications network, such as cameras or other sensors, which can provide data-capture information from the incident. This equipment may include pre-installed security cameras, microphones and various other types of sensors, which may be part of a private data-capture system. This equipment may also include other cameras, microphones and other type of sensors that are in proximity of the incident, for example computers and smart phones. Although equipment with sensing capabilities such as smartphones may provide data-capture information at an incident, this may not have been the original purpose of the smartphone. In practice, a smartphone that is at the scene of an incident 'by chance' may temporarily have the potential to provide valuable information. Such equipment may form part of a variety of private communications networks, including networks owned by companies, banks, schools or private individuals. With known systems, there are frequently situations where information from such non-public safety equipment is not available to a first responder. There may also be no way for the first responder to know of the existence or position of equipment that does not form part of the public safety communications network. This may be the case, for example, when it is dark, when fire or smoke obstructs the view, or when there is a barricaded incident such as in a hostage situation. Henceforth, any equipment that can provide data-capture at an incident, but which is not part of the public safety communications network, will be referred to as a 'data-capture device'. Typically, such data-capture devices are in a different, private domain than a wireless communication device of a public safety first responder at an incident.

There is a need to improve the information available to public safety wireless communications devices during an incident. This need applies both during the time before a first responder reaches an incident, and during attendance 'on-scene' at the incident. In general, there is a need for a public safety first responder to be able to access incident-related media or information from a variety of public and/or private devices.

Accordingly, there is a need for a method and apparatus for receiving a data stream during an incident.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 10 illustrates a table of numbered actions shown in FIGS. 11 and 12.

Figure 1:
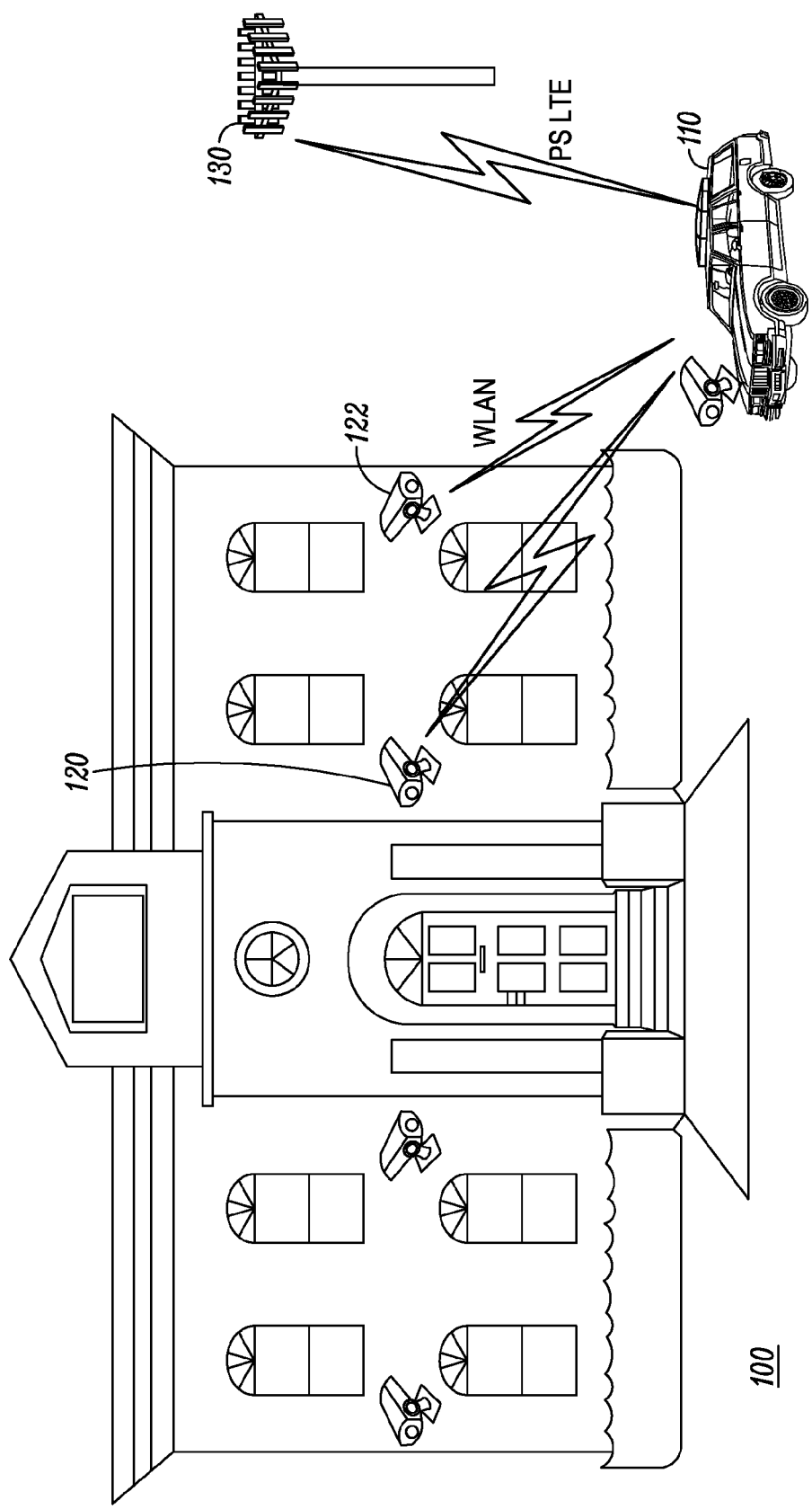
FIG. 1 is a schematic diagram of an incident scene in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of accessing a data-capture device by public safety wireless communications equipment during an incident is provided. A dispatch controller of a public safety wireless communications system receives a token from a server of a non public-safety network, at a time of occurrence of an incident. The token allows access to at least one data-capture device in a domain of the server of the non public-safety network, and the token has an association with the incident. The dispatch controller sends the token to the at least one data-capture device. The dispatch controller then receives a data stream from the at least one data-capture device, and forwards the data stream to a public safety wireless communication device.

FIG. 1 is a schematic diagram of an incident scene 100 in accordance with some embodiments. Here an 'incident' may be an emergency situation, such as a fire, or an ongoing crime. When such an incident occurs, it is desirable for both Public Safety (PS) and private domain wireless communication devices, in the vicinity of the incident, to receive information about the incident. Both PS and private domain wireless communication devices may be able to securely and automatically join an incident network. The incident network may itself be created dynamically by an incident response team. The information provided to various members of the incident response team aids the incident response team to respond more effectively.

First data-capture device 120 and second data-capture device 122 may be mounted on a suitable structure, such as a building or post. Once connected to the PS network, first and second data-capture devices 120 and 122 may form part of a Wireless Local Area Network (WLAN) as illustrated in FIG. 1. The WLAN may also comprise a vehicle 110. Vehicle 110 may be a police, fire or other vehicle belonging to one of the public services. Vehicle 110 is in attendance at incident scene 100 in order to help out at the incident occurring there. A user of vehicle 110 will typically be a member of a PS response team. Vehicle 110 and the user of vehicle 110 may be in communication with a base station 130. For example, vehicle 110 may communicate via a PS Long Term Evolution (LTE) network.

At incident scene 100, some or all of the data-capture devices will be non-PS devices. Those data-capture devices may be a in a private network, and may be connected to a domain server of a private domain. Prior to occurrence of the incident, typically, there would be no on-going communication between the PS network, and the private domain server and first data-capture device 120 or second data-capture device 122.

At incident scene 110, there is therefore a need to securely and rapidly access, activate, and deliver incident related media and information from both PS and private devices to the PS response team. With growing numbers of data-capture devices in use, the system of FIG. 1 can automate access to non-PS data-capture devices, which might provide information useful to various PS staff. Examples of non-PS data-capture devices that could be used to aid or assist at an incident are cameras, sensors such as microphones, etc.

Two time periods can be considered, with reference to incident scene 100. The first time period is the time between the realization that there is an incident, e.g., when receiving a 911 call or a public safety official becoming aware of an incident, and the arrival on scene of PS personnel, for example in vehicle 110. This first time period will henceforth be referred to as 'pre-arrival'. The second time period is the time between the arrival of at least one first responder at the incident scene and the end of the incident. This second time period will henceforth be referred to as 'on-scene'. Some incidents, such as sieges or shootings, may require many hours of coverage, i.e., that an incident network be set up for several hours. The end of the incident may be considered, for example, to be the time point when there is no longer any value in PS personnel being able to receive information from first and second data-capture devices 120 and 122.

At incident scene 100, there may be an advertisement of the fact that there has been an incident. The purpose of the advertisement is to notify first and second data-capture devices 120 and 122 that there is an incident. This incident advertisement may take the form of a message broadcast about the incident. One or both of first data-capture device 120 and second data-capture device 122 may be able to receive and respond to the incident advertisement broadcast. Vehicle 110 may, for example, provide over its WLAN a statement that there is a fire, or that a suspect is in the vicinity. The incident advertisement broadcast may be triggered either manually or automatically. The incident advertisement broadcast may be triggered remotely, for example via the PS LTE link to base station 130.

The existence of first data-capture device 120 and second data-capture device 122 may be detected by 'device discovery'. The process of device discovery may be achieved in one or more of a variety of ways. Devices may be discovered through geo-location, or by polling of devices in the vicinity. The geo-location or polling may be carried out by the dispatch controller, the incident control centre, a first responder on scene, or by vehicle 110. When using polling, the first data-capture device 120 and second data-capture device 122 may be arranged to scan constantly for various incident advertisements. First data-capture device 120, second data-capture device 122, and other data-capture devices in the vicinity of incident scene 100 will then detect the incident advertisement message, and join the local hotspot network of vehicle 110. Various data-capture devices in a private domain thus become 'discoverable' to a PS dispatch controller and/or other elements of the PS incident network.

After they have been discovered and joined to the PS response team, first data-capture device 120, second data-capture device 122, and other data-capture devices in the vicinity of incident scene 100 will stream media to the PS wireless communication devices. For example, if first data-capture device 120 is a camera, it may stream video and/or sound. The video may be streamed directly to PS vehicle 110, and/or to the incident control center, which is not shown on FIG. 1. First data-capture device 120 may stream the media directly to other wireless communication devices. However, the media may instead pass from first data-capture device 120 to a domain server in the private domain. First data-capture device 120 may either be in the domain of that domain server, or in the domain of a second domain server that can be accessed by the domain server. Henceforth, various media, data, pictures or other information from the data-capture device(s) will be referred to as a data stream.

Figure 2:
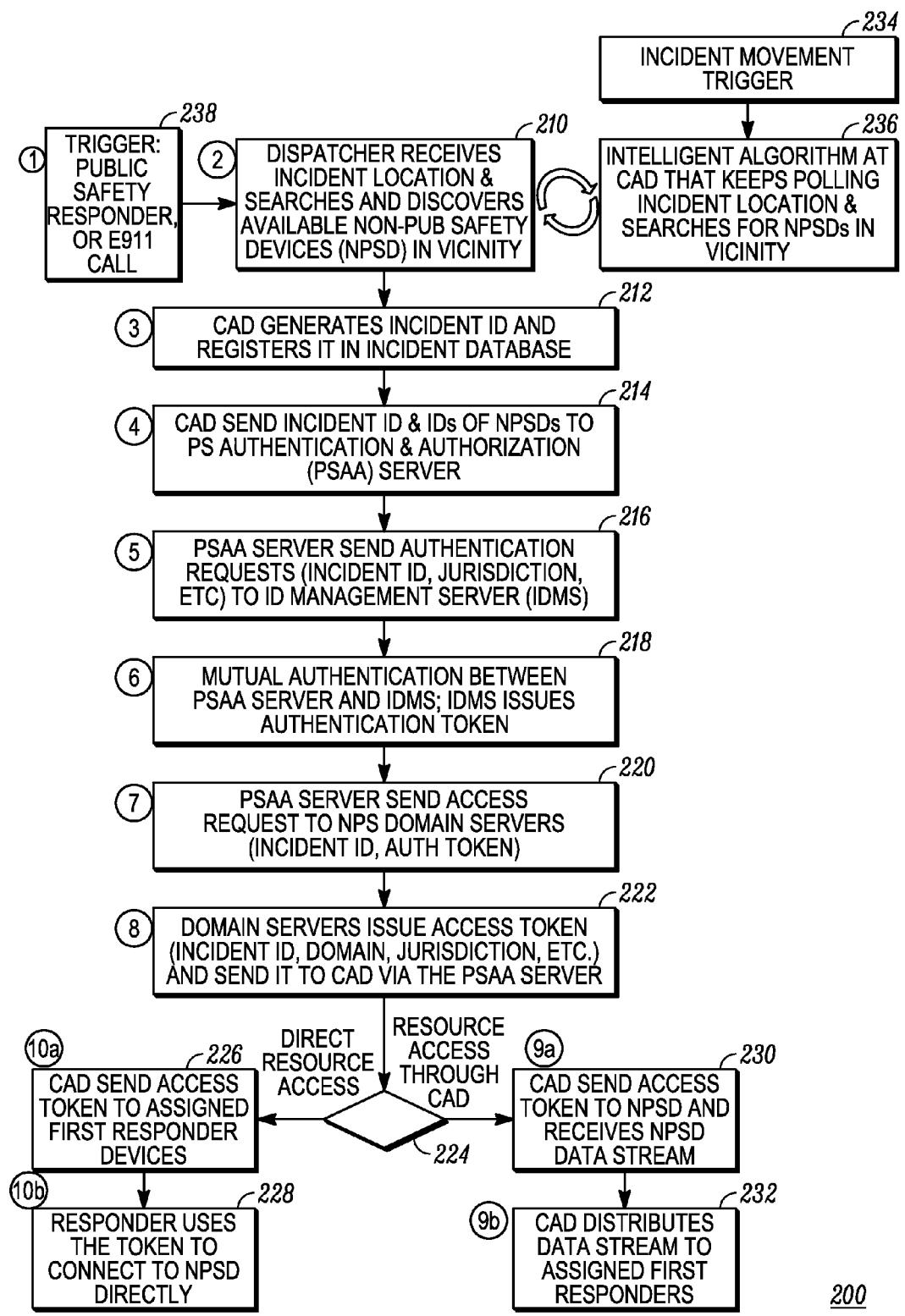
FIG. 2 is a flowchart of a method of accessing and distributing a data stream in accordance with some embodiments.

FIG. 2 is a flowchart 200 of a method of accessing and distributing a data stream in accordance with some embodiments. FIGS. 2-5 should be read together. Circled references 1 to 8, 9a, 9b, 10a and 10b match circled references with the same numbers on FIG. 3. This enables the reader to tie each action in the flowchart of FIG. 2 into an arrow on FIG. 3. FIGS. 2-5 typically apply before a wireless communication device belonging to a first responder has reached an incident scene.

FIG. 2 describes an embodiment where a Computer Aided Dispatcher (CAD) co-ordinates incident detection and device discovery. The trigger for the method of FIG. 2 may be a communication, at 238, from a public safety responder, or a '911' emergency call. However, an incident movement trigger 234 may be detected by an intelligent algorithm that repeatedly polls the incident location, at 236. As a result of this polling, the CAD may identify non-PS devices (NPSDs) at the incident location, such as first data-capture device 120 and second data-capture device 122 of FIG. 1.

As shown at 210, the CAD is then in a position to co-ordinate linking various devices, which may be done 'pre-arrival', i.e., before a PS wireless communication device arrives at the incident scene. At 212, the CAD generates an incident identification (ID), such as a serial number, and then registers the incident ID in an incident database. At 214, the CAD sends to a PS 'Authentication and Authorization Server' (PSAA): (i) the incident ID; and (ii) identification details of NPSDs that the CAD has detected in the vicinity of the incident location.

At 216, the PSAA server then sends on authentication requests to an 'ID Management Server' (IDMS). The authentication request may comprise some or all of the incident ID, information about the jurisdiction of the PS response team, an identifier of the jurisdiction of the public safety wireless communication system, a geo-location of the incident, a geo-fence boundary and/or the jurisdiction in which the incident is occurring.

Figure 3:
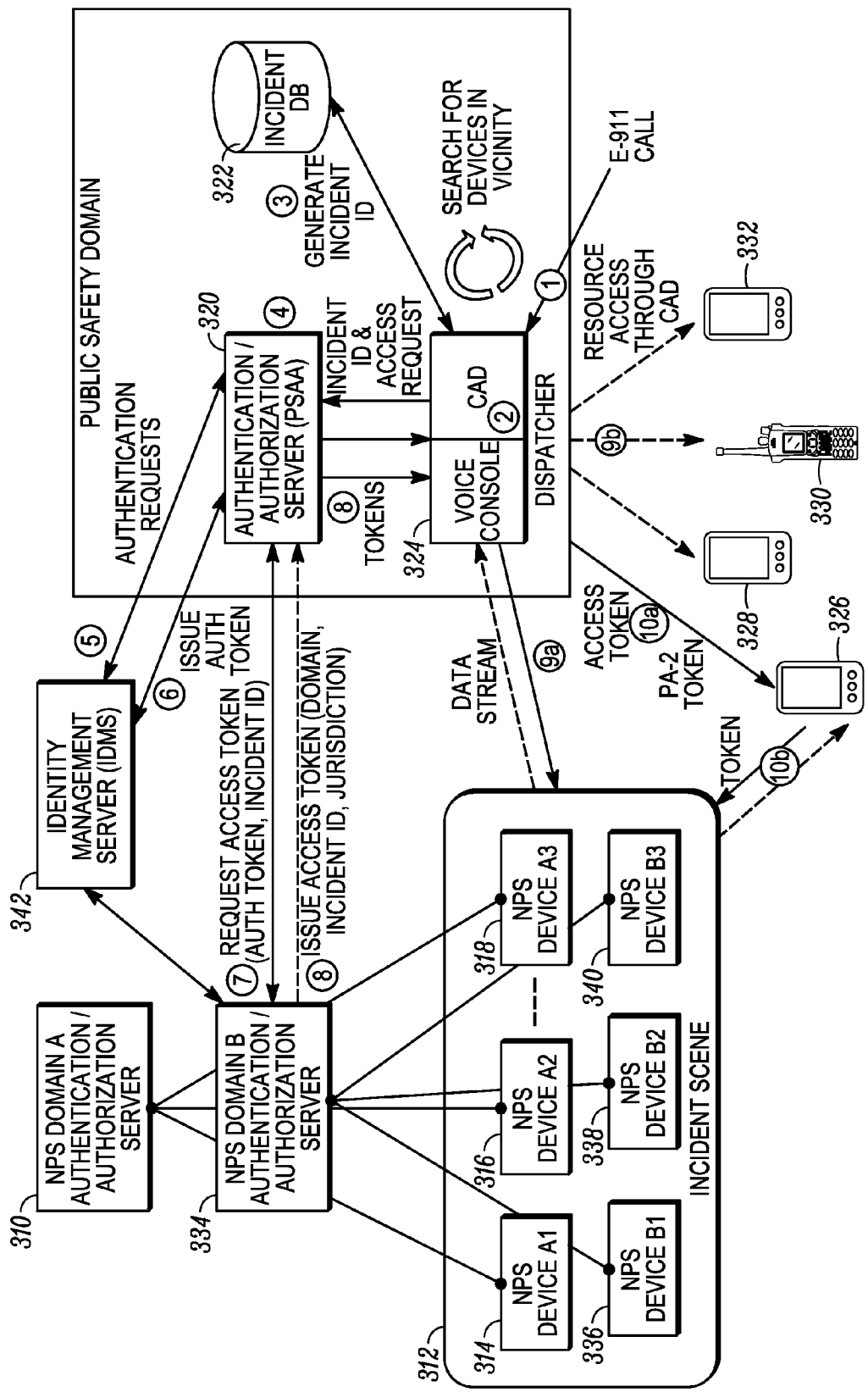
FIG. 3 is a schematic block diagram of system operation in a 'pre-arrival' scenario, in accordance with some embodiments.

Three security assumptions underlie the operation of the embodiment of FIG. 3. These security assumptions are: (i) Each PS server and participating non-PS domain server has a pre-existing trust relationship with the IDMS, the trust relationship being established in anticipation of the need to link these devices at the time of a future incident; (ii) the non-PS domain servers authorize access, and generate 'access tokens'; (iii) there is an authenticated and encrypted communication tunnel available between the PS- and non-PS backhauls, for token distribution. The tunnel may involve using the Secure Sockets Layer (SSL) or Hyper Text Transfer Protocol Secure (HTTPS) protocols. The term 'access token' refers to a digital token, which gives the holder the right to access one or more other devices. So, if a mobile communication device of a PS responder at an incident scene receives an access token, that mobile communication device is able to access another device, such as a non-PS device or a non-PS domain server, from which a data stream may then be received. The access token may in addition appoint the receiving mobile communication device and its user as a member of the PS response team for a particular incident. In some embodiments, the mobile communication device that receives the access token may also be able to pass the token to, for example, the CAD or other mobile communication devices in a communication group of which the mobile communication device is a member. An access token may be received by the CAD, in some embodiments. In addition or alternatively, the access token may be received directly by a mobile communication device from the non-PS server or a data-capture device.

At 218, mutual authentication occurs between the PSAA server and the IDMS. This results in the IDMS issuing an authentication token. At 220, once the PSAA has the authentication token, it can then forward the authentication token together with the incident ID, as an access request. The PSAA forwards the access request to at least one non-PS domain server.

The at least one non-PS domain server, given the trust relationships described above, is then in a position to issue an access token. At 222, the at least one non-PS domain server issues an access token that specifies the incident ID that originated at 212 from the CAD, information about the domain, and the information about the jurisdiction that originated at 216. The at least one non-PS domain server sends the access token, in this embodiment, via the PSAA server to the CAD.

At 224, a decision is made about whether the responders' wireless communication devices are to access the data stream(s) directly, or whether the data stream(s) are to be supplied to the CAD and then distributed by the CAD to the responders' wireless communication devices.

When, at 224, the responders' wireless communication devices are to access the data stream(s) directly, then at 226, the CAD sends the access token to the wireless communication devices of the first responders who have been appointed to the incident. At 228, one or more of the first responders will forward the token to the NPSD, and then receive the data stream directly. The data stream from the NPSD will not pass through the CAD on route to the first responders' wireless communication device. This may provide the advantage of making receipt of the data stream by the first responders' wireless communication device less susceptible to interruptions in the link between the CAD and the first responders' wireless communication device. So the first responder may still receive the data stream when there is no, or only patchy/spotty, backend access. Such a situation may arise, for example, in a disaster situation where network components might be destroyed.

Alternatively or in addition, when, at 224, the data stream(s) are to be supplied to the CAD and then distributed by the CAD to the responders' wireless communication devices, then, at 230, the CAD sends the access token to at least one NPSD. The NPSD then provides the data stream to the CAD. At 232, the CAD distributes the data stream to the wireless communication devices of the first responders who have been appointed to the incident, which may include for example vehicle 110 of FIG. 1. This may provide the advantages of: (i) allowing many first responders' wireless communication devices to receive the data stream, even when the NPSD is itself unable to provide direct transmission to a large number of individual wireless communication devices, itself; and (ii) making the receipt of the data stream by the first responders' wireless communication device less reliant on a direct link between the NPSD and the first responders' wireless communication devices, given that the NPSD may have relatively low transmission power and/or a non-ideal location for wide signal transmission.

In some embodiments, both direct transmission of a data stream from the NPSD and transmission via the CAD may be available. Thus different first responders' wireless communication devices may simultaneously receive the data stream via different routes. In addition to, or instead of, the NPSD providing the data stream, the domain server for the domain in which the NPSD is located may provide the data stream.

Access tokens convey information to a recipient of the token about incident related parameters. These parameters may include the relevant security domain, and geographic/ jurisdictional boundaries. The token may be dynamic. As the location and/or extent of an incident changes over time, the token may also be altered or updated. Any such change to the access token may terminate the authorization of some wireless communication devices from being part of the incident response team. Alternatively or in addition, the change to the access token may enable new wireless communication devices to join the incident response team. Changes to the authorization token may also enable first responder devices to receive media from data-capture devices or domains that were not previously accessible, prior to the change to the access token.

FIG. 3 is a schematic block diagram of system operation in a 'pre-arrival' scenario, in accordance with some embodiments. Solid arrows in FIG. 3 indicate protected intercommunications between the various elements illustrated in FIG. 3, for example the forwarding of access tokens. Dotted arrows indicate protected media or data streaming between the various elements illustrated in FIG. 3.

Incident scene 312 comprises non-PS (NPS) device A1 with reference 314, NPS device A2 with reference 316, and NPS device A3 with reference 318. NPS devices 314, 316 and 318 belong to domain A, and are linked to NPS domain A server 310. NPS domain A server 310 also provides authentication and authorization services. NPS device B1 with reference 336, NPS device B2 with reference 338, and NPS device B3 with reference 340 belong to domain B, and are linked to NPS domain B server 334. NPS domain B server 334 also provides authentication and authorization services.

IDMS server 342 is shown linked to NPS domain B server 334, and is also linked to NPS domain A server 310, although that link is not shown to simplify the figure. IDMS server 342 is also linked to PSAA server 320 in the PS domain. A voice console for a human dispatcher is shown combined with a CAD at 324, with a link to PSAA server 320 and to an incident database 322, which elements 320, 322, and 324 are elements of a Public Safety (PS) domain. Although the CAD and Voice Console are shown as separate elements, this is only for the purposes of illustration. Reference 324 should be considered, more generally, as showing a 'Dispatch Station' or dispatch controller, which is made up of voice and data capabilities through either a voice console or Computer Aided Dispatch.

The double rotating arrow to the right of voice console/CAD 324 indicates the process of polling an incident location and searching for NPSD devices by the CAD, which was explained in connection with action 236 of the flowchart of FIG. 2.

Wireless communication devices 326, 328, 330 and 332 are linked to voice console/CAD 324. At least wireless communication device 326 is also directly linked to one or more of the NPS devices at incident scene 312.

The circled digits 1-9, 9a, 9b, 10a and 10b should be read together with the corresponding numbers on flowchart 200 of FIG. 2. Circled digits 1-9, 9a, 9b, 10a and 10b tie the various actions of flowchart 200 to the corresponding actions indicated by arrows on FIG. 3.

Figure 4:
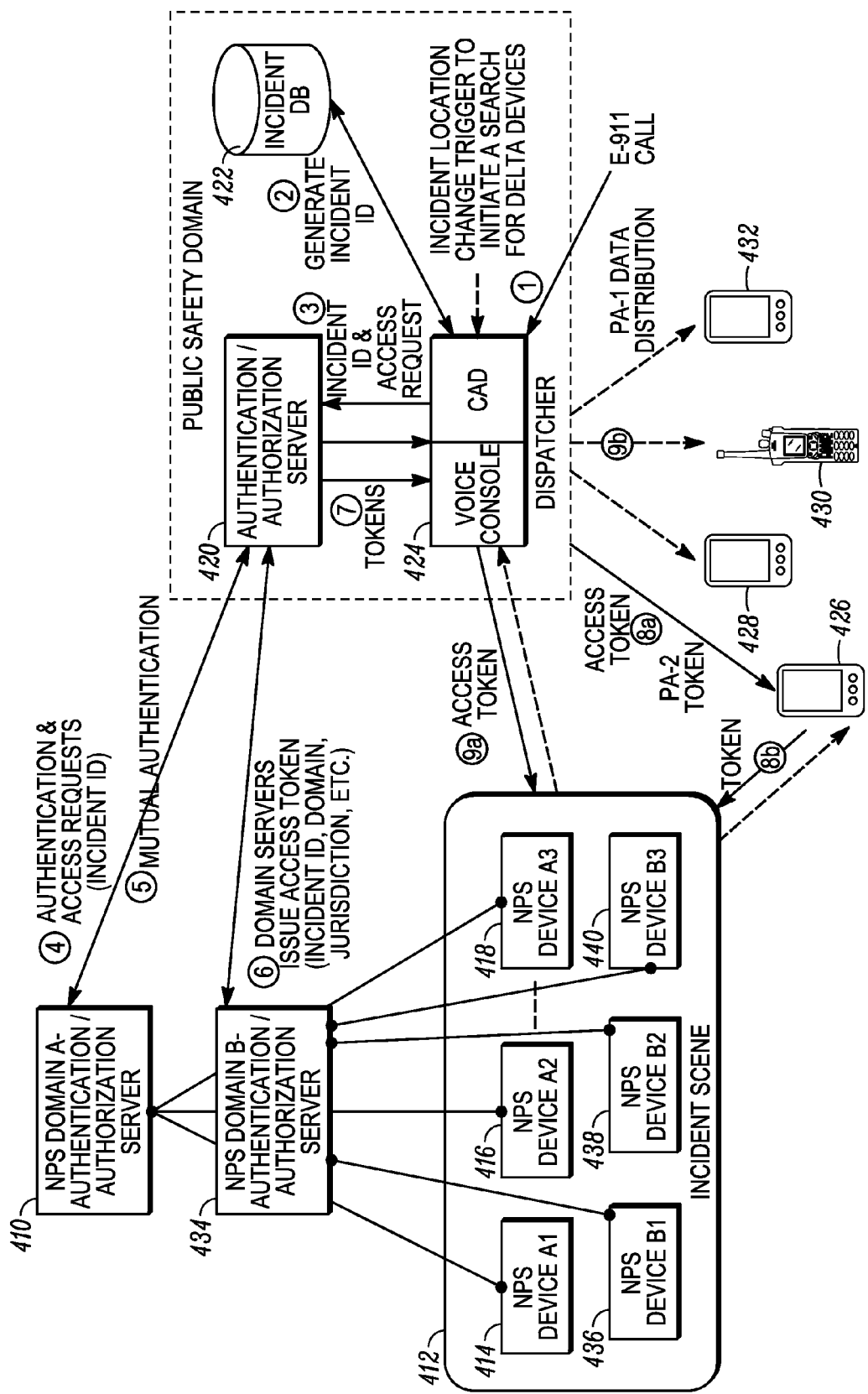
FIG. 4 is a schematic block diagram of system operation in an alternative 'pre-arrival' scenario, in accordance with some embodiments.

FIG. 4 is a schematic block diagram of system operation in an alternative 'pre-arrival' scenario, in accordance with some embodiments. Some of the circled reference numerals have been re-used on FIG. 4, for actions that correspond to those on FIG. 3. Solid arrows indicate protected intercommunications, and dotted arrows indicate protected media or data streaming, between the various elements illustrated in FIG. 4.

In the system operation of FIG. 4, non-PS domain servers perform authentication and authorization, and generate and issue one or more access tokens. These non-PS domain servers may be, for example, private domain servers, with first data-capture device 120 and second data-capture device 122 of FIG. 1 being part of one of the private domains. In FIG. 4, the actions referenced with circled digits 4-6 occur directly between authentication/authorization server 420 and both NPS Domain A server 410 and NPS Domain B server 434. Similar to FIG. 3, FIG. 4 further depicts an incident scene 412 comprising NPS devices A1, 414, A2, 416 and A3, 418 that belong to domain A and that are linked to an NPS domain A server 410, NPS devices B1, 436, B2, 438, and B3, 440 that belong to domain B and that are linked to NPS domain B server 434. Further, similar to FIG. 3, FIG. 4 depicts a voice console for a human dispatcher combined with a CAD at 424 (which collectively may be referred to as a 'dispatch controller'), with a link to a PSAA server 420 and to an incident database 422, which elements 420, 422, and 424 are elements of a Public Safety (PS) domain and wherein the CAD performs the process of polling an incident location and searching for NPSD devices. Also, similar to FIG. 3, FIG. 4 depicts multiple wireless communication devices 426, 428, 430 and 432 that are linked to voice console/CAD 424 and wherein at least wireless communication device 426 is also directly linked to one or more of the NPS devices at incident scene 412.

The system operation illustrated in FIG. 4 is possible whenever there is a pre-existing trusted relationship between the non-NPS servers and the PS servers. This trust relationship may rely, for example, on the exchange of certificates or shared security keys. Whereas FIG. 3 used IDMS 342 to provide identity management functions, this is not the case in the alternative 'pre-arrival' scenario of FIG. 4. PSAA server 420 of FIG. 4 communicates directly with NPS Domain A server 410 and NPS Domain B server 434.

The security assumptions underlying the system operation of FIG. 4 are that: (i) There is a secure tunnel (e.g. SSL/HTTPS) between the PS elements and all participating non-PS domains, by means of PKI, pre-configured secret keys, or other pre-existing security associations; (ii) the non-PS domain authorizes access and generates the access tokens; (iii) in the case of a moving incident, the PS backhaul/CAD may need to keep requesting access tokens from non-NPS domain servers that are currently in proximity to the incident.

Figure 5:
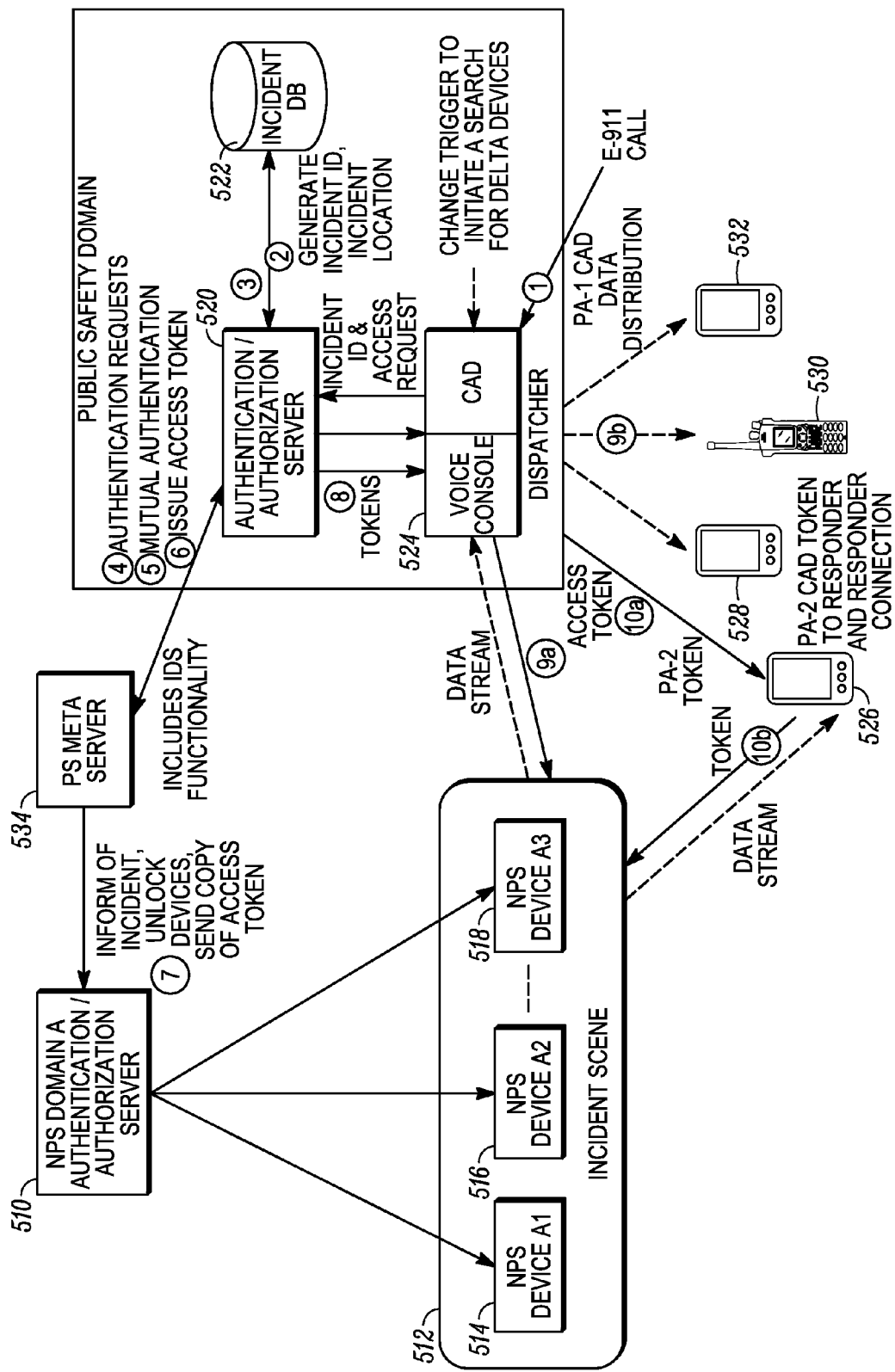
FIG. 5 is a schematic block diagram of system operation in another alternative 'pre-arrival' scenario, in accordance with some embodiments.

FIG. 5 is a schematic block diagram of system operation in another alternative 'pre-arrival' scenario, in accordance with some embodiments. Some of the circled reference numerals from FIG. 3 have been re-used on FIG. 5, for actions that correspond to those on FIG. 3. Solid arrows indicate protected intercommunications, and dotted arrows indicate protected media or data streaming, between the various elements illustrated in FIG. 5.

In order to simplify FIG. 5, the NPS Domain B server and the NPS devices of Domain B have been omitted from FIG. 5. NPS domain server A 510, and NPS devices A1 514, A2, 516 and A3, 518, at an incident scene 512, are all shown. However, the actions indicated in FIG. 5 as applying to NPS domain server A 510 and NPS devices 514, 516 and 518 apply also to other non-PS devices and their domain server(s) that are not shown in FIG. 5. Similar to FIGS. 3 and 4, FIG. 5 further depicts a voice console for a human dispatcher combined with a CAD at 524 (which collectively may be referred to as a 'dispatch controller'), with a link to a PSAA server 520 that is, in turn, linked to an incident database 522, which elements 520, 522, and 524 are elements of a Public Safety (PS) domain and wherein the CAD performs the process of polling an incident location and searching for NPSD devices. Also, similar to FIGS. 3 and 4, FIG. 5 depicts multiple wireless communication devices 526, 528, 530 and 532 that are linked to voice console/CAD 524 and wherein at least wireless communication device 526 is also directly linked to one or more of the NPS devices at incident scene 512. In the system operation of FIG. 5, a 'PS meta server' 534, with a link to an incident database 522, replaces IDMS 342 of FIG. 3. This system operation is possible whenever all participating NPS servers and the PS servers trust a single party. That single party may be a third party, or may be a part of the PS domain. In addition to IDMS functionality, PS meta server 534 generates and issues universal incident tokens. These universal incident tokens can be used across different security domains, e.g., enabling the coverage of mobile incidents. In the system operation of FIG. 5, PS meta server 534 firstly performs authentication and authorization. PS meta server 534 then generates and issues the universal incident tokens for mobile communication devices that may be on route to the incident, i.e., pre-arrival. Circled reference 7 in FIG. 5 indicates that PS meta server 534 is capable of informing the NPS Domain servers about an incident, unlocking various NPS devices, and providing a copy of the access tokens.

The security assumptions underlying the system operation of FIG. 5 are that: (i) PS meta server 534 and all participating NPS have a trust relationship, and a secure communication link is available to them; (ii) PS meta server 534 can authorize access participating NPS devices; and (iii) PS meta server 534 can unlock NPS devices. PS meta server 534 may be arranged to only unlock the NPS devices in emergency situations, rather than just to allow routine streaming of media to wireless communication devices of PS response team members.

Referring back to FIG. 4, actions 4, 5 and 6 in the upper centre of FIG. 4 occurred directly between PSAA server 420, and both NPS Domain A server 410 and NPS Domain B server 434 of FIG. 4. In FIG. 5, in contrast, actions 4, 5 and 6 occur between PSAA server 520 and PS meta server 534. Then, as action 7, PS meta server 534 informs the NPS Domain server A 510 and other domain servers about the incident, and potentially unlocks NPS Domain server A 510. PS meta server 534 can also send a copy of the access token to NPS Domain server A 510.

With the 'on-scene' scenarios of FIGS. 3-5, therefore, public safety wireless communications equipment may access a data-capture device during an incident. A dispatch controller of a public safety wireless communications system may receive a token from a server of a non-public safety network at a time of occurrence of an incident, the token allowing access to at least one data-capture device in a domain of the server and the token having an association with the incident. The dispatch controller may send the token to at least one public safety wireless communication device. The at least one public safety wireless communication device may send the token to the data-capture device or a server of the non-public safety network and receive a data stream directly from the data-capture device or the server of the non-public safety network.

FIGS. 6-12 illustrate various 'on scene' scenarios. In the scenarios illustrated in FIGS. 6-12, at least one wireless communication device of a first responder has reached part of the incident scene, such as that shown in FIG. 1. The scene may be spread over an extended area, such as several blocks of a city, for example. However, in the 'on scene' scenarios, at least one wireless communication device of a first responder is within direct communication range of at least part of the domain of the data-capture device. For example, the first responder may be able to communicate directly with at least one data-capture device. The first responder may be able to communicate with the domain server of the at least one data-capture device, and/or with another domain server, which can communicate with the domain server of the at least one data-capture device. The 'on scene' scenarios are therefore ones in which some local operation of the wireless communication device of a first responder may take place without intervention or involvement of the CAD. Although in many real life scenarios a CAD is available for much of the duration of an incident, with the scenarios illustrated in FIGS. 6-12, the wireless communication device of the first responder may no longer be dependent on the availability of the CAD to set up and/or operate the incident network.

Figure 6:
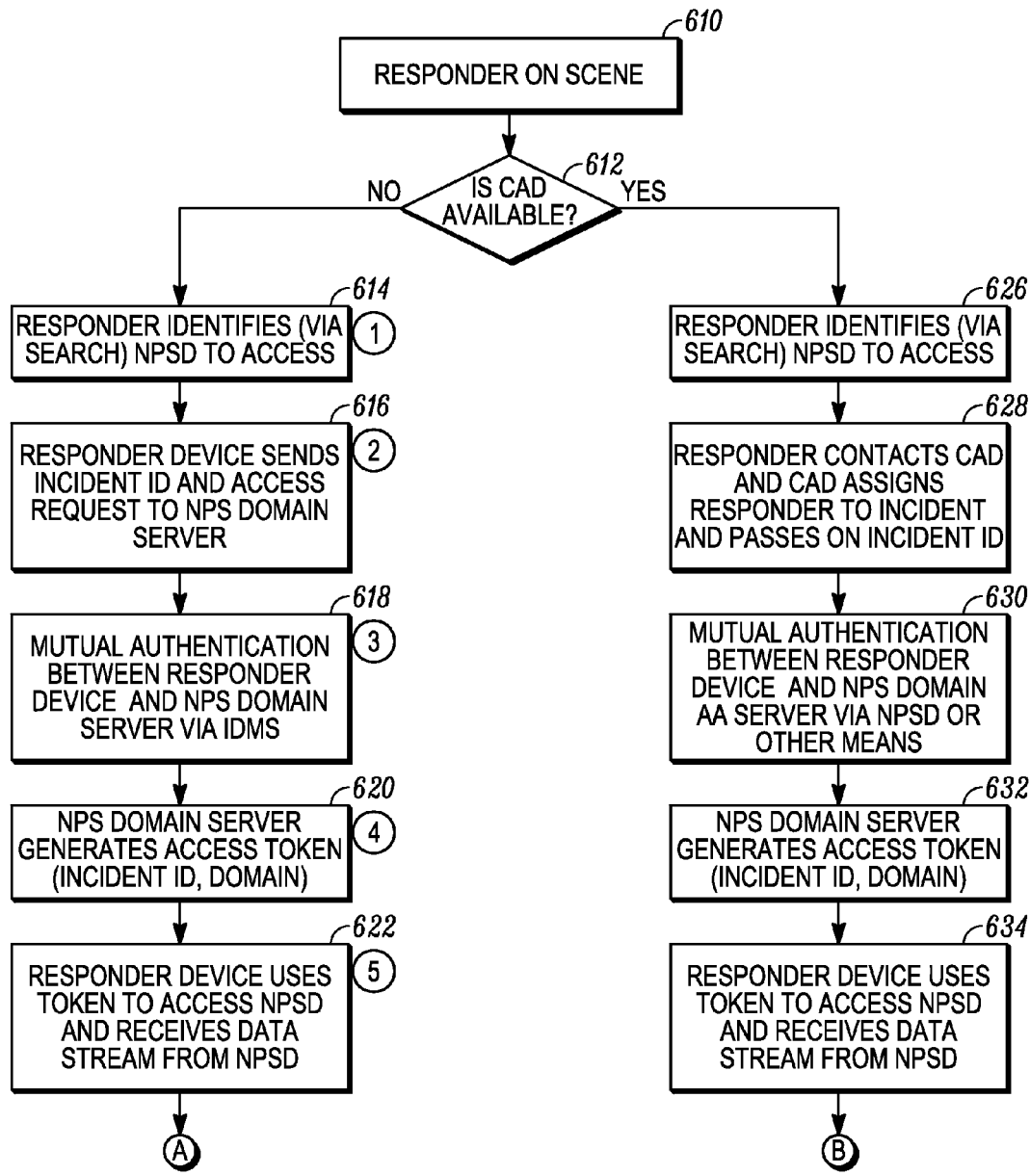
FIG. 6 is a flowchart of a method of accessing and distributing a data stream in accordance with some embodiments.
Figure 7:
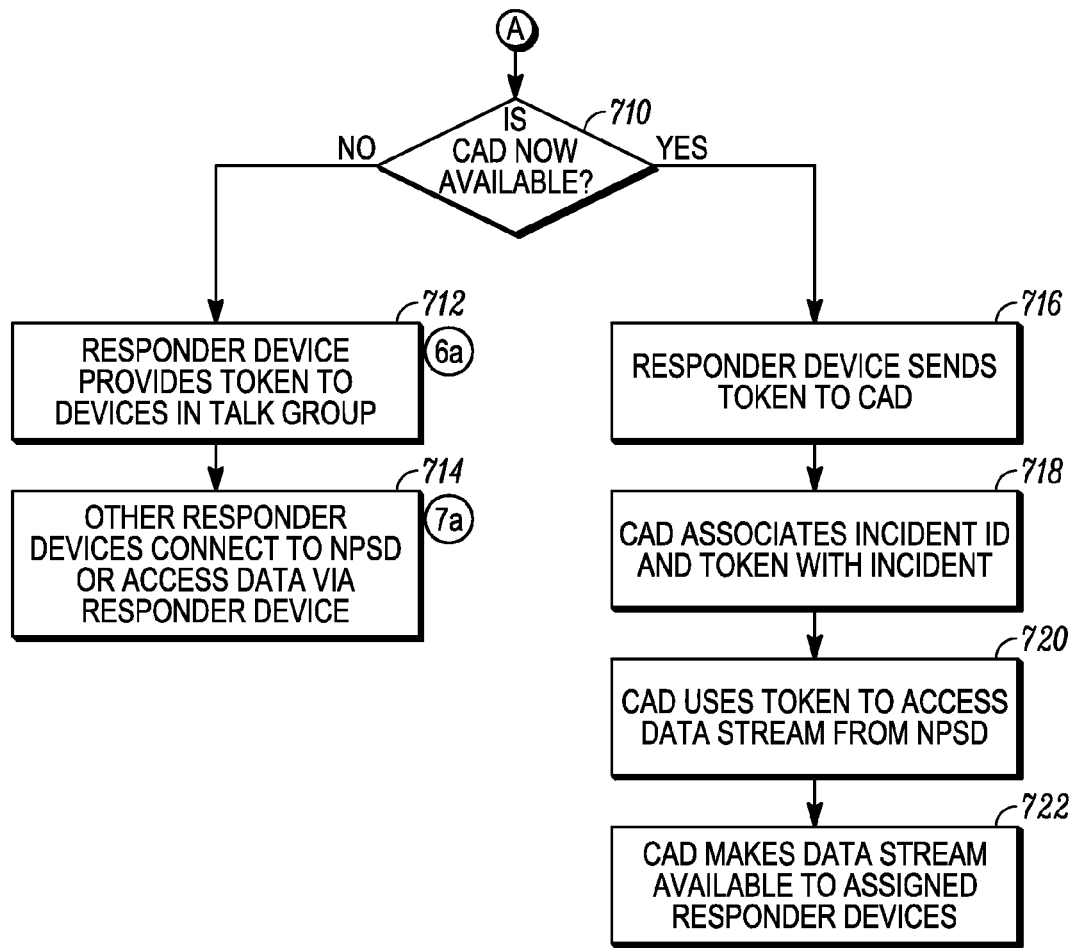
FIG. 7 is a continuation of the flowchart of FIG. 6.
Figure 8:
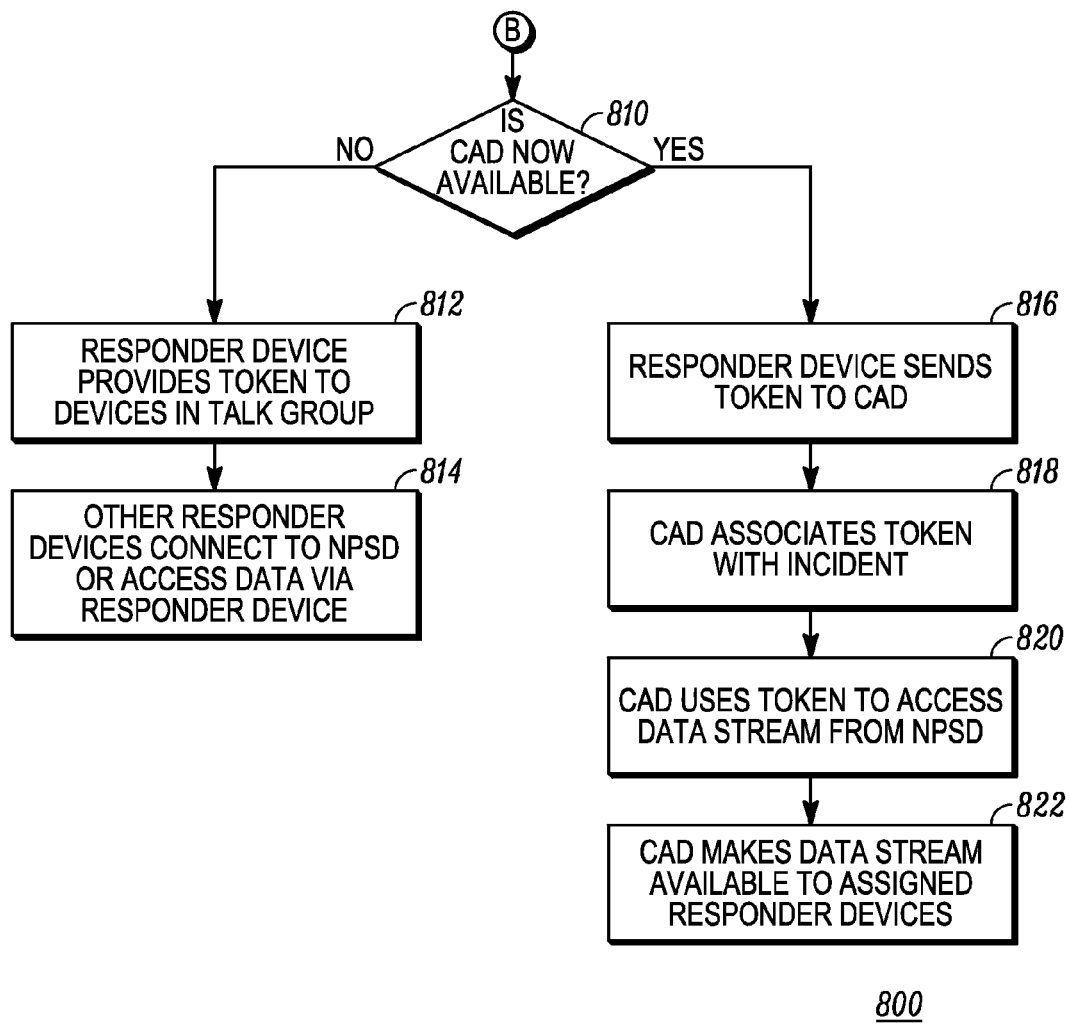
FIG. 8 illustrates an alternative continuation of the flowchart of FIG. 6.
Figure 9:
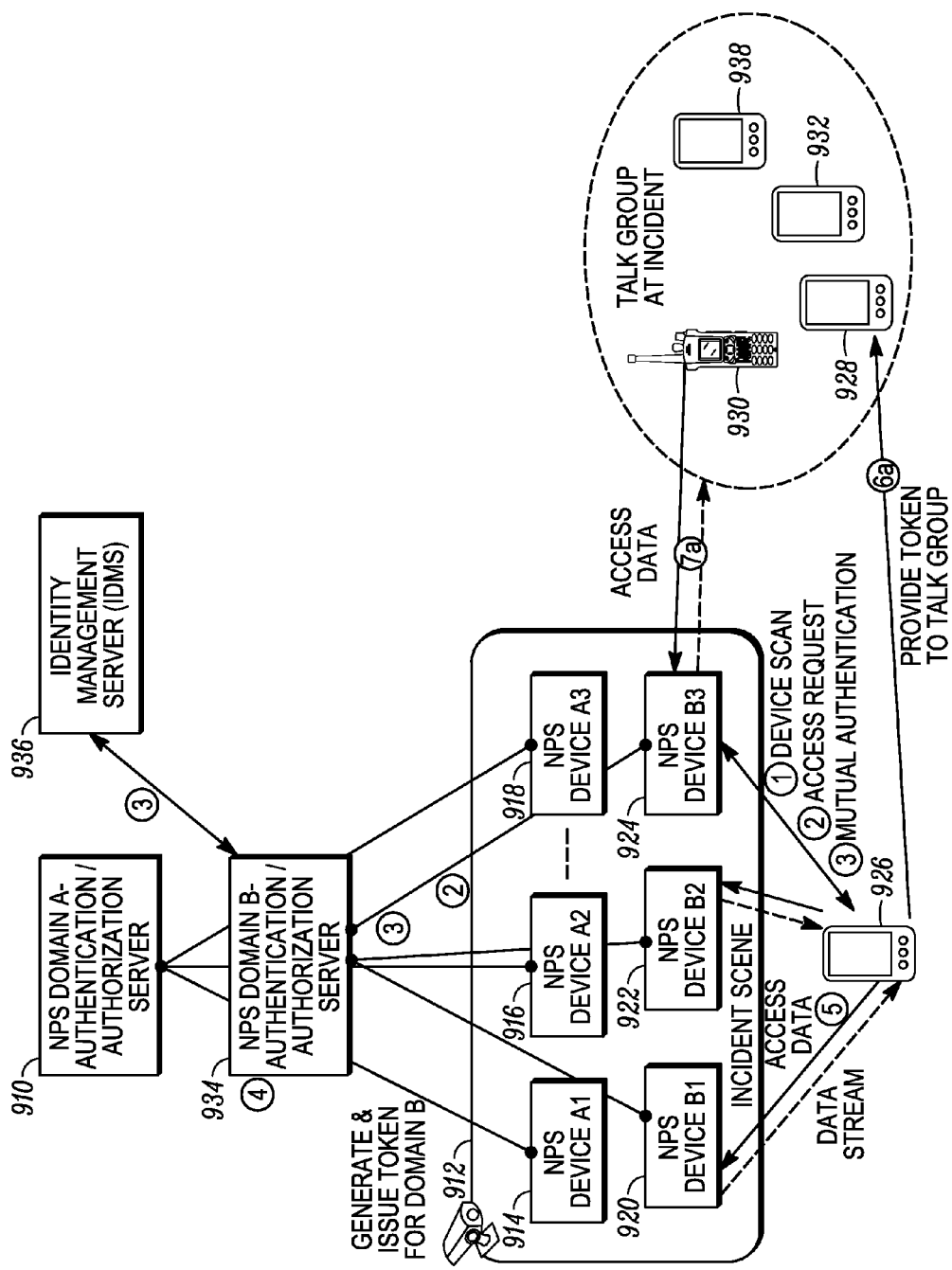
FIG. 9 is a schematic block diagram of system operation in an 'on-scene' scenario, in accordance with some embodiments.

FIGS. 6-8 are a flowchart of a method of accessing and distributing a data stream in accordance with some embodiments. FIG. 7 is a continuation of the flowchart of FIG. 6. FIG. 8 illustrates an alternative continuation of the flowchart of FIG. 6. FIG. 9 provides a schematic block diagram of the system operation for the 'on-scene' scenario described at 614-622 in FIGS. 6 and 712 and 714 in FIG. 7.

When a first responder is on scene, at 610, the first responder decides at 612 whether or not there is a communication link to the CAD. When no link is available, the method proceeds to 614. At 614, the first responder carries out a search, to identify any data-capture devices at the location of the scene. Once the first responder has identified at least one data-capture device, the first responder sends an incident ID and an access request to the non-PS domain server(s) of the at least one data-capture device, at 616. The CAD may have provided the incident ID to the first responder previously, for example when assigning the first responder to the incident. Alternatively, the first responder may generate an incident ID. In another alternative embodiment, the first responder may, at 616, contact another domain server, which is able to provide a communication link to the domain server of the data-capture device.

At 618, mutual authentication occurs between the first responder and the non-PS domain server(s). The non-PS domain server(s) use an IDMS to authenticate the first responder, as can also be seen towards the upper centre of FIG. 9. At 620, the non-PS domain server generates the access token, which is supplied to the first responder. At 622, the first responder is then able to send the token to the data-capture device and thereby receive media/data streamed from the data-capture device. In an alternative embodiment, at 622, the first responder may receive media/data streamed from the non-PS domain server.

After 622, the method proceeds to decision box 710 in FIG. 7. At 710, the first responder re-assesses whether the CAD is available. When the CAD is not available, the first responder may provide the token to other members of a communication group of which the first responder is part, at 712. At 714, the other first responders of the communication group may use the token to connect directly to the data-capture device. Alternatively, the first responder may itself forward the data stream received from the data-capture device to the other first responders of the communication group.

The method described for the 'on-scene' scenario, at 614-622 in FIG. 6 and at 712 and 714 in FIG. 7, is illustrated in schematic block diagram form in FIG. 9. FIG. 9 can be compared to FIG. 3, which also utilized an IDMS, but applied typically to the 'pre-arrival' scenario.

Returning to FIG. 7, when the CAD is available at 710, the first responder may, at 716, send the token to the CAD.

At 718, the CAD associates the incident ID and the token with the incident. The CAD associates the incident ID with the incident, when the first responder generated the incident ID on scene. At 720, the CAD uses the token to access the data stream from either the data-capture device, the domain server of the data-capture device, or another domain server that can link to the domain server of the data-capture device. At 722, the CAD makes the data stream available to the wireless communication devices of assigned first responders. The CAD may assign various first responders by sending the token to those first responders. When they have received the token, some first responders' wireless devices can connect to the CAD to view the data stream. In general, a first responder may 'pull' the data stream from the CAD, by connecting to the CAD. The CAD may 'push' the data stream to particular responders, to which it chooses to stream the data.

Returning to the start of FIG. 6, when decision box 610 results in the first responder having access to the CAD, the method proceeds to step 626. At 626, the first responder carries out a search, to identify any data-capture devices at the location of the scene. Once the first responder has identified at least one data-capture device, the first responder contacts the CAD, at 628. The CAD assigns the first responder to the incident. The CAD generates the incident ID, and passes the incident ID on to the first responder. At 630, mutual authentication occurs between the first responder and the non-PS domain server(s). The non-PS domain server(s) use the IDMS to authenticate the first responder. At 632, the non-PS domain server generates the access token, which it supplies to the first responder. At 634, the first responder is then able to send the token to the data-capture device and thereby receive media/data streamed from the data-capture device. In an alternative embodiment, at 634, the first responder may receive media/data streamed from the non-PS domain server.

After 634, the method proceeds to decision box 810 in FIG. 8. At 810, the first responder re-assesses whether the CAD is available. When the CAD is not available, the first responder sends the token to the other members of the communication group of which the first responder is part, at 812. At 814, the other first responders of the communication group may use the token to connect directly to the data-capture device. Alternatively, the first responder may itself forward the data stream received from the data-capture device to the other first responders of the communication group.

When, at decision box 810, the CAD is available, the method proceeds to 816. The first responder, at 816, sends the token to the CAD. At 818, the CAD associates the token with the incident. The CAD generated the incident ID, so does not need to associate the incident ID with the incident as previously at 718. At 820, the CAD uses the token to access the data stream from either the data-capture device, the domain server of the data-capture device, or another domain server that can link to the domain server of the data-capture device. At 822, the CAD makes the data stream available to the wireless communication devices of other assigned first responders. The CAD may assign various first responders by sending the token to those first responders. The other first responders' wireless devices can connect to the CAD to view the data stream. The CAD may 'push' the data stream to particular responders, to which it chooses to stream the data.

At 712 and 812, the wireless communication device sends the token to the one or more other public safety wireless communication devices of its communication group. At least one of the other public safety wireless communication devices of the communication group may send the token to the non-public-safety data-capture device and receive the data stream directly from the data-capture device and/or the server of the non-public safety network. Alternatively, the one or more other public safety wireless communication devices of the communication group may authenticate directly with the public safety device, and not with the data-capture device, prior to the public safety device streaming the data stream to the one or more other public safety wireless communication devices. One or more wireless communication devices that do not form part of the communication group may authenticate with the wireless communication device, and receive the data stream from the public safety device. Some data capture devices may only be able to stream data directly to a certain number of wireless communication devices. There may therefore be a threshold maximum number of wireless devices set, to which the data-capture device can stream data directly. When a number of wireless communication devices wishing to receive the data stream exceeds the threshold maximum number, additional wireless communication devices wishing to receive the data stream may then only receive the data stream from the public safety device. In order to immunize the number of wireless communication devices that connect directly to the data-capture device, wireless communication devices wishing to receive the data stream may only be permitted to receive the data stream directly from the data-capture device when the public safety device cannot provide the data stream.

FIG. 9 is a schematic block diagram of system operation in an 'on-scene' scenario, in accordance with some embodiments. The circled numbers 1-5, 6a, 7a shown on FIGS. 6 and 7 are reproduced on FIG. 9. Solid arrows in FIG. 9 indicate protected intercommunications between the various elements illustrated in FIG. 9, for example the forwarding of access tokens. Dotted arrows indicate protected media or data streaming between the various elements illustrated in FIG. 9. Similar to FIG. 3, FIG. 9 depicts an incident scene 912 comprising NPS devices A1, 914, A2, 916 and A3, 918 that belong to domain A and that are linked to an NPS domain A server 910 and NPS devices B1, 920, B2, 922, and B3, 924 that belong to domain B and that are linked to NPS domain B server 934. FIG. 9 further depicts an IDMS 936 linked to NPS domain B server 934, a wireless communication device 926, and a communication group at the incident comprising wireless communication devices 928, 930, 932 and 934. At least wireless communication device 926 is directly linked to one or more of the NPS devices at incident scene 912, that is, NPS devices 920, 922 and 924, and further is linked to a wireless communication device 928 of the communication group. Further, a wireless communication device 930 of the communication group is linked to one or more of the NPS devices at incident scene 912, that is, NPS device 924.

The security assumptions underlying the system operation of FIG. 9 are that: (i) the PS devices and all participating non-PS domain servers have a pre-existing trust relationship with the IDMS; (ii) the non-PS domain authorizes access, and generates local access tokens; (iii) there are existing secure communication links in a communication group of which the first responder is a member, which enables token distribution by the first responder to other members of the communication group.

Comparison of FIG. 9 and FIG. 3 shows that FIG. 9 does not illustrate the 'Public Safety Domain' elements shown in the top right quadrant of FIG. 3, because FIG. 9 illustrates the situation where the first responder operates 'on scene' entirely without contact between the first responder and the CAD.

Figure 11:
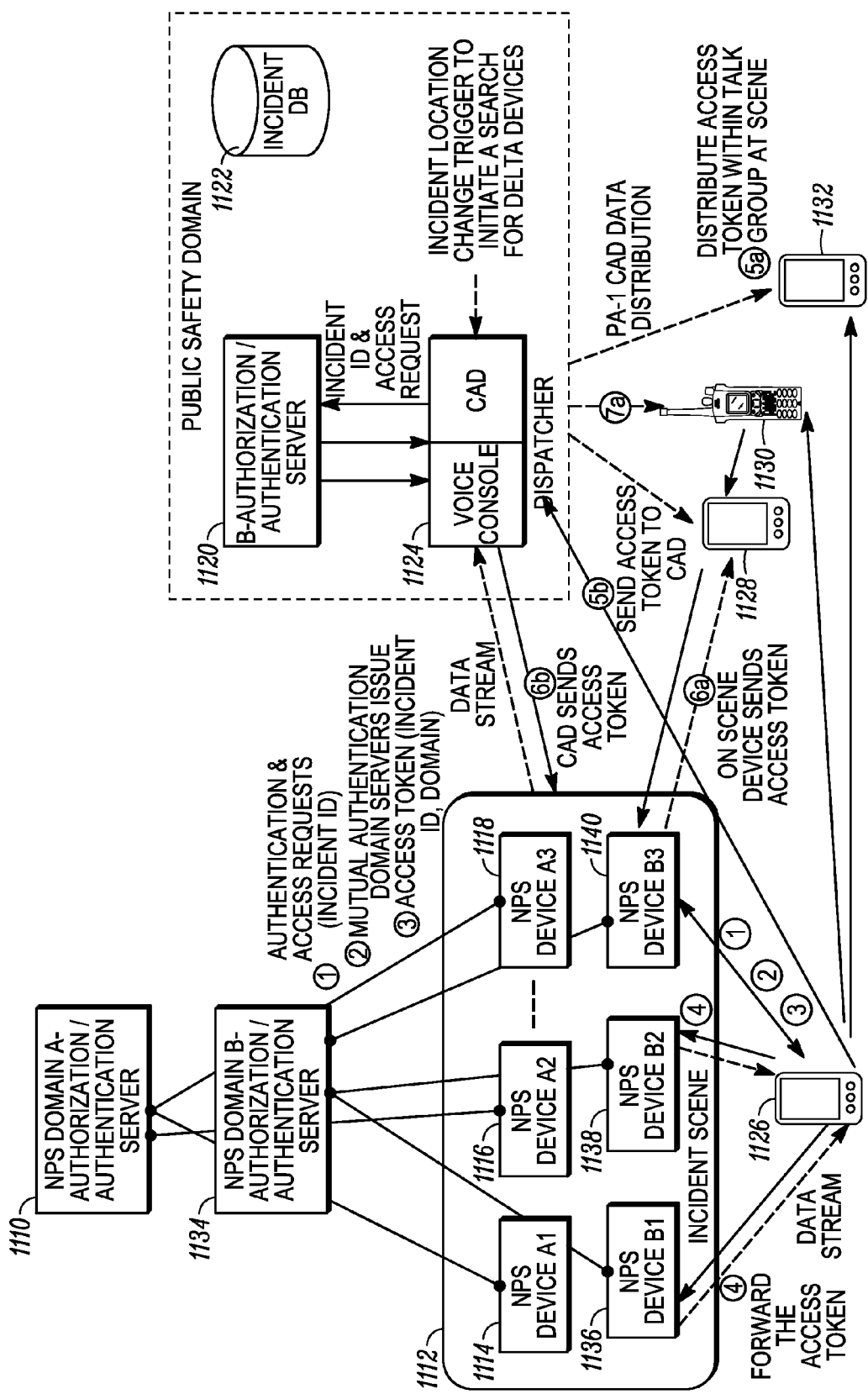
FIG. 11 is a schematic block diagram of system operation in an alternative 'on-scene' scenario, in accordance with some embodiments.
Figure 12:
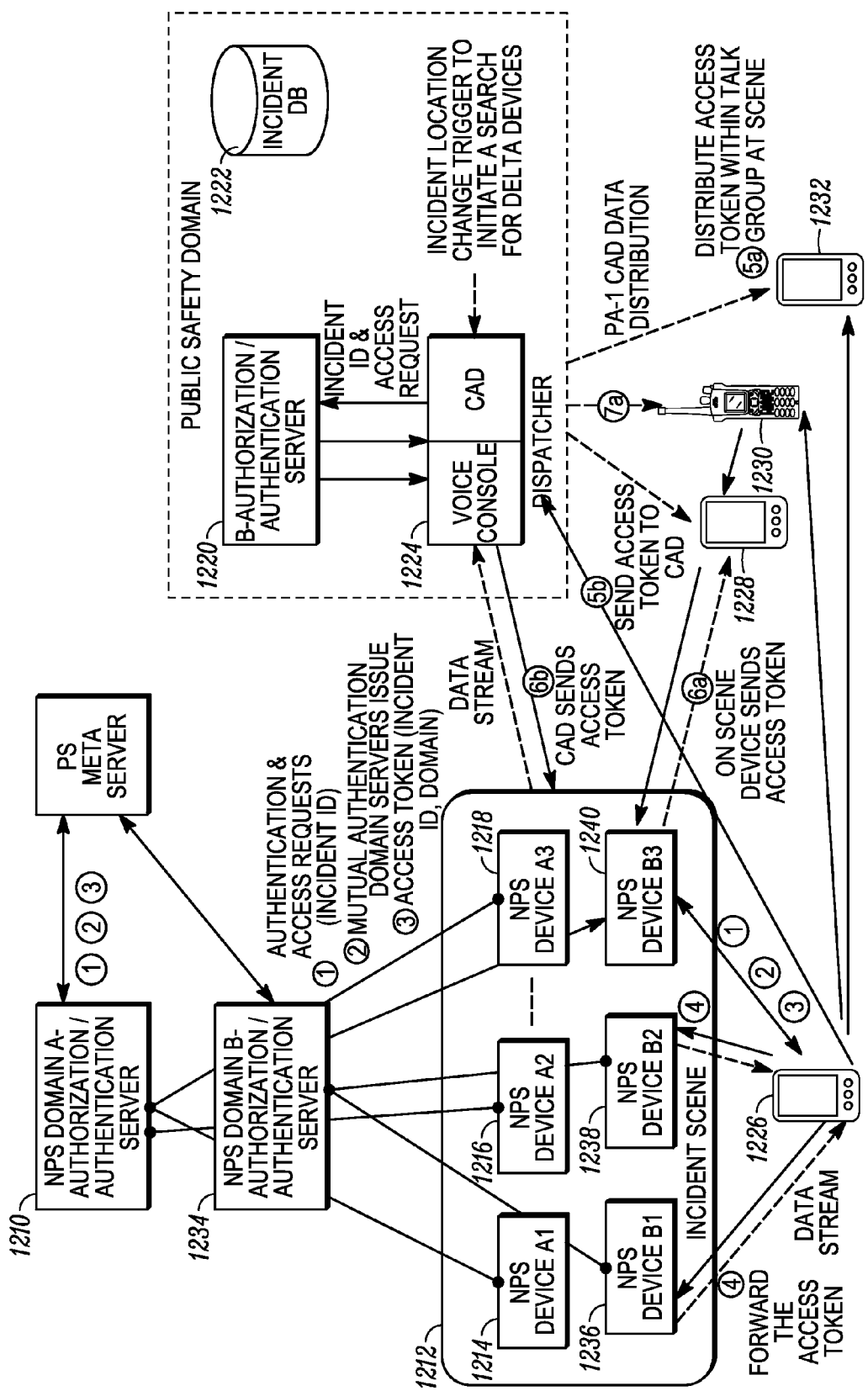
FIG. 12 is a schematic block diagram of system operation in another alternative 'on-scene' scenario, in accordance with some embodiments.

FIG. 10 illustrates a table of numbered actions that are also shown in FIGS. 11 and 12. FIG. 10 shows actions that may occur in two alternative 'on scene' scenarios, when the first responder is able to access the CAD.

FIG. 11 shows those actions in a schematic block diagram of system operation in an alternative 'on-scene' scenario to that in FIG. 9. Solid arrows in FIG. 11 indicate protected intercommunications between the various elements, and dotted arrows indicate protected media or data streaming Similar to FIG. 4, FIG. 11 depicts an incident scene 1112 comprising NPS devices A1, 1114, A2, 1116 and A3, 1118 that belong to domain A and that are linked to an NPS domain A server 1110, NPS devices B1, 1136, B2, 1138, and B3, 1140 that belong to domain B and that are linked to NPS domain B server 1134, a PSAA server 1120 that is linked to a voice console for a human dispatcher combined with a CAD 1124 (which collectively may be referred to as a 'dispatch controller'), wherein the CAD performs the process of polling an incident location and searching for NPSD devices, and an incident database 1122, which elements 1120, 1122, and 1124 are elements of a PS domain. FIG. 11 further depicts multiple wireless communication devices 1126, 1128, 1130 and 1132 that are linked to voice console/CAD 1124. At least wireless communication device is also directly linked to one or more of the NPS devices at incident scene 1112, that is, wireless communication device 1126 is depicted as linked to NPS devices 1136, 1138 and 1140 and wireless communication device 1128 is depicted as linked to NPS device 1140. Further, wireless communication device 1126 is linked to wireless communication devices 1130 and 1132 and wireless communication device 1128 is linked to wireless communication device 1130.

In the scenario of FIG. 11, the domain A and domain B servers provide authorization and authentication for a first responder that is on scene. The security assumptions underlying the schematic block diagram of FIG. 11 are that: (i) there is a secure tunnel available between the PS devices and all the participating non-PS domains (PKI or pre-configured secret keys) for token distribution; (ii) the non-PS domain servers authorize access, and generate the access tokens. FIG. 11 can be compared with FIG. 4, where the authentication and authorization servers also operate without an IDMS. However, in FIG. 11, the authentication and authorization servers communicate with the first responder(s).

FIG. 12 shows the actions of FIG. 10 in a schematic block diagram of system operation in another alternative 'on-scene' scenario to that in FIG. 9. Solid arrows in FIG. 12 indicate protected intercommunications between the various elements, and dotted arrows indicate protected media or data streaming Similar to FIGS. 5 and 11, FIG. 12 depicts an incident scene 1212 comprising NPS devices A1, 1214, A2, 1216 and A3, 1218 that belong to domain A and that are linked to an NPS domain A server 1210 and NPS devices B1, 1236, B2, 1238, and B3, 1240 that belong to domain B and that are linked to NPS domain B server 1234. Similar to FIG. 5, FIG. 12 further depicts a PS meta server linked to NPS domain A server 1210 and to NPS domain B server 1234. Similar to FIG. 11, FIG. 12 also depicts a voice console for a human dispatcher combined with a CAD at 1124 (which collectively may be referred to as a 'dispatch controller') with a link to a PSAA server 1220, wherein the CAD performs the process of polling an incident location and searching for NPSD devices, and an incident database 1222, which elements 1120, 1122, and 1124 are elements of a PS domain. Further, similar to FIG. 11, FIG. 12 depicts multiple wireless communication devices 1226, 1228, 1230 and 1232 that are linked to voice console/CAD 1224. In addition, similar to FIG. 11, at least wireless communication device is also directly linked to one or more of the NPS devices at incident scene 1212, that is, wireless communication device 1226 is linked to NPS devices 1236, 1238 and 1240 and wireless communication device 1228 is linked to NPS device 1240. Further, similar to FIG. 11, wireless communication device 1226 is linked to wireless communication devices 1230 and 1232 and wireless communication device 1228 is linked to wireless communication device 1230.

In the scenario of FIG. 12, the domain A and domain B servers provide authorization and authentication for a first responder on scene, but with the assistance of a PS meta server, to which the domain servers have access. The security assumptions underlying the schematic block diagram of FIG. 12 are that: (i) the PS Meta server and all the participating non-PS servers have a trust relationship and they also have a secure communication link available; (ii) the PS Meta server can authorize access to participating non-PS devices; (iii) in emergencies, the PS Meta server can unlock non-PS devices itself, without first getting permission from the NPS domain server, or even informing that server. FIG. 12 can be compared with FIG. 5, where the authentication and authorization servers communicate with the PS meta server. However, in FIG. 12, the authentication and authorization servers receive authentication and access requests from the first responder(s). The PS meta server provides the access token in response to authentication and access requests forwarded by the authentication and authorization servers, rather than in response to requests from the CAD as in FIG. 5.

As has been described, an IDMS server may provide mutual authentication, as illustrated in FIGS. 3 and 9. However, the IDMS need not be used, whenever there is pre-existing 'trust' between the non-PS servers and the PS elements, such as the PS servers. That pre-existing trust relationship may be based on, for example, shared certificates or shared keys. This situation is illustrated in FIGS. 4 and 11. Alternatively, a meta server may replace the IDMS. This is possible whenever all the participating non-PS servers and the PS elements trust a single party. That single party may be a third party, or part of the PS domain. The meta server generates and issues universal incident tokens, which can be used across different security domains. So a PS wireless communication device may then receive a data stream from non-PS data-capture devices, for example private domain data-capture devices. This situation is illustrated in FIGS. 5 and 12. The block diagrams of FIGS. 3-5, 9, 11 and 12 illustrate systems with seamless incident mobility, in which an incident response group may be able to receive and distribute data streams, with or without the involvement of a CAD.

With the arrangement of FIGS. 9, 11 and 12, public safety wireless communications equipment may access a data-capture device during an incident. A public safety wireless communication device, at a time of an incident, may identify a non-public safety data-capture device at a location of an incident, and receive a token directly from a server of a non-public-safety network, the token allowing secure access to the non-public-safety data-capture device at the location of the incident. The public safety wireless communication device may: (i) send the token to the non-public-safety data-capture device; (ii) receive a data stream directly from the non-public-safety data-capture device and/or from the server of the non-public safety network; and (iii) send the token and/or stream the data stream to one or more other public safety wireless communication devices of a communication group, the public safety wireless communication device being a member of the communication group.

A public safety wireless communication device may access a data-capture device, at a time of an incident, by identifying a non-public-safety data-capture device at a location of the incident. The public safety wireless communication device may receive a token directly from a server of a non-public-safety network, the token allowing secure access to the non-public-safety data-capture device, and send the token to a dispatch controller of a public safety wireless communications system. The dispatch controller of the public safety wireless communications system may then forward the token to one or more other public safety wireless communication devices. Alternatively, the dispatch controller may send the token to the server of the non-public-safety network, receive a data stream directly from the server of the non-public-safety network, and forward the data stream to the one or more other public safety wireless communication devices.

As described previously, device discovery may be carried out for mobile incidents, and the access achieved may be secure. The CAD and/or first responders on scene may continuously search for candidate data-capture devices, as an incident location changes. These searches may occur across different security domains. The data-capture devices themselves may detect a mobile incident, in response to an incident advertisement. The 'geo-fence area' within which an incident is considered to lie, may change. The access token may be changed, to reflect this. Either the CAD or an on-scene first responder may intelligently route or distribute access information. This access information is for data-capture devices that have been discovered.

The access token enables the association of a data-capture device acting as a source of data with responder devices related to the incident. The token enables the streamlining of Public Safety CAD operational steps, for example by use of the token to assign one or more responders to an incident.

Various Internet and Industry Standards for Token-Based Access Control are known. Examples are 'OpenIDConnect', 'OAuth', and Security Assertions Markup Language (SAML). Such protocols can be used to implement parts of the token request, generation and distribution processes described above, when the IDMS or the PS meta server are used. However, changes may need to be made to these standard protocols, to support all the necessary information, such as the incident ID and location, and the various architectures described above. The standard protocols are not suitable for architectures where there is no trust between the parties and a trusted third party.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of accessing a data-capture device by public safety wireless communications equipment during an incident, the method comprising:
a public safety wireless communication device, at a time of an incident:
receiving, from a dispatch controller of a public safety wireless communications system, an incident identification;
identifying a non-public safety data-capture device at a location of an incident, the non-public safety data-capture device belonging to a domain;
sending an access request including the incident identification to a server of a non-public safety network, the server of the non-public safety network belonging to the domain;
authenticating to the server of the non-public safety network via an identification management server;
receiving, directly from the server of the non-public-safety network, a token generated by the server of the non-public safety network, the token including the incident identification and allowing secure access to the non-public-safety data-capture device at the location of the incident;
sending the token to the non-public-safety data-capture device;
receiving a data stream directly from the non-public-safety data-capture device and/or from the server of the non-public safety network; and
sending the token and/or streaming the data stream to one or more other public safety wireless communication devices of a communication group, the public safety wireless communication device being a member of the communication group.

2. The method of claim 1, further comprising:
when the public safety wireless communication device sends the token to the one or more other public safety wireless communication devices of the communication group, at least one of the other public safety wireless communication devices of the communication group:
sending the token to the non-public-safety data-capture device; and
receiving a data stream directly from the data-capture device and/or the server of the of the non-public safety network.

3. The method of claim 1, further comprising:
the one or more other public safety wireless communication devices of the communication group authenticating with the public safety wireless communication device based on the incident identification of the token, prior to the public safety wireless communication device streaming the data stream to the one or more other public safety wireless communication devices of the communication group.

4. The method of claim 1, further comprising:
one or more wireless communication devices that do not form part of the communication group:
authenticating with the public safety wireless communication device; and
receiving the data stream from the public safety wireless communication device.

5. A method of accessing a data-capture device by public safety wireless communications equipment during an incident, the method comprising:
a public safety wireless communication device, at a time of an incident:
receiving, from a dispatch controller of a public safety wireless communications system, an incident identification;
identifying a non-public-safety data-capture device at a location of the incident;
receiving, directly from a server of a non-public-safety network, a token generated by the server of the non-public safety network, the token including the incident identification and allowing secure access to the non-public-safety data-capture device;
sending the token to the dispatch controller of a public safety wireless communications system;
the dispatch controller of the public safety wireless communications system:
forwarding the token to one or more other public safety wireless communication devices that are public safety wireless communication devices of assigned first responders, or based on the incident identification of the token; or
sending the token to the server of the non-public-safety network, receiving a data stream directly from the server of the non-public-safety network, and forwarding the data stream to the one or more other public safety wireless communication devices.

6. An apparatus for of accessing a data-capture device during an incident, the apparatus comprising:
a public safety wireless communication device comprising:
a processor that is configured to:
receive, from a dispatch controller of a public safety wireless communications system, an incident identification;
identify a non-public safety data-capture device at a location of an incident, the non-public safety data-capture device belonging to a domain;
send an access request including an incident identification to a server of a non-public safety network, the server of the non-public safety network belonging to the domain;
authenticating to the server of the non-public safety network via an identification management server;
receive, directly from the server of the non-public-safety network, a token generated by the server of the non-public safety network, the token including the incident identification and allowing secure access to the non-public-safety data-capture device at the location of the incident;
send the token to the non-public-safety data-capture device;
receive a data stream directly from the non-public-safety data-capture device and/or from the server of the non-public safety network; and
send the token and/or streaming the data stream to one or more other public safety wireless communication devices of a communication group, the public safety wireless communication device being a member of the communication group.

7. The apparatus of claim 6, wherein the processor further is configured to:
when the public safety wireless communication device sends the token to the one or more other public safety wireless communication devices of the communication group, at least one of the other public safety wireless communication devices of the communication group:
send the token to the non-public-safety data-capture device; and
receive a data stream directly from the data-capture device and/or the server of the of the non-public safety network.

8. The apparatus of claim 6, wherein the processor further is configured to:
authenticate the one or more other public safety wireless communication devices of the communication group, prior to the public safety wireless communication device streaming the data stream to the one or more other public safety wireless communication devices of the communication group.

9. The apparatus of claim 6, wherein the processor further is configured to:
authenticate one or more wireless communication devices that do not form part of the communication group; and
convey the data stream to the one or more wireless communication devices that do not form part of the communication group.

* * * * *